(12) United States Patent
Homme

(10) Patent No.: US 7,324,291 B2
(45) Date of Patent: Jan. 29, 2008

(54) RETRACTABLE TYPE LENS BARREL

(75) Inventor: Shigeo Homme, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 166 days.

(21) Appl. No.: 11/342,500

(22) Filed: Jan. 30, 2006

(65) Prior Publication Data

US 2006/0176587 A1     Aug. 10, 2006

(30) Foreign Application Priority Data

Feb. 10, 2005    (JP)   ............................ 2005-034001

(51) Int. Cl.
*G02B 15/14*     (2006.01)
(52) U.S. Cl. ...................................... 359/699; 359/701
(58) Field of Classification Search ........ 359/694–706, 359/822, 823, 819
See application file for complete search history.

(56) References Cited

U.S. PATENT DOCUMENTS 4,729,644 A * 3/1988 Ueyama ..................... 359/701
5,172,276 A * 12/1992 Ueyama et al. ............. 359/813
5,576,894 A * 11/1996 Kuwana et al. ............. 359/701

FOREIGN PATENT DOCUMENTS

JP     2003-043336     2/2003

* cited by examiner

*Primary Examiner*—M. Hasan
(74) *Attorney, Agent, or Firm*—Cohen Pontani Lieberman & Pavane LLP

(57) ABSTRACT

A lens barrel for zooming in the photographing region and retraction to the non-photographing region, equipped with a stationary barrel having a cam groove on the inner circumferential surface thereof, a cam barrel having a cam pin which is engaged with the cam groove, provided on the outer circumferential surface thereof and supported rotatably to the stationary barrel and movably along the optical axis. The inner circumferential surface of the stationary barrel has a first cam groove to be used at least in a part of the photographing region and a second cam groove to be used at least in a part of the non-photographing region, and the outer circumferential surface of the cam barrel has a first cam pin to be engaged with the first cam groove and a second cam pin to be engaged with the second cam groove.

7 Claims, 5 Drawing Sheets

RETRACTABLE TYPE LENS BARREL

This application is based on Japanese Patent Application No. 2005-034001 filed on Feb. 10, 2005, which is incorporated hereinto by reference.

BACKGROUND OF THE INVENTION

This invention relates to a retractable type lens barrel for photographic lenses provided on cameras.

For portability, a camera has conventionally been made thinner by narrowing the distance between lens groups which are optical elements constituting its photographic optical system, and storing in the camera when the camera is not used. Generally, such a camera adopting so-called a retractable lens barrel comes into wide use.

A general retractable type lens barrel is composed of a stationary barrel having a cam groove on the inner circumferential surface thereof, a cam barrel having a cam pin which is engaged with the cam groove of the stationary barrel on the outer circumferential surface thereof and a cam groove on the inner circumferential surface thereof and supported to rotate and move along the optical axis, and a lens retainer having a cam pin which is engaged with the cam groove of the cam barrel, wherein the cam barrel relatively moves the lens retainer along the optical axis for zooming and retracting when rotated.

For example, there has been disclosed a lens barrel having a cam groove for retracting and a cam groove for picture-taking on the stationary barrel, wherein the cam groove for retracting is shallower than the cam groove for picture-taking. (See Patent Document 1.)

[Patent Document 1] Japanese Non-Examined Patent Publication 2003-43336

The lens barrel as described in Patent Document 1 provides, on the stationary barrel, a notched part to have a driving gear mechanism to rotate the cam barrel and a straight guide groove with which a straight guide is engaged. Generally, the notched part and the straight guide groove are provided away from the cam grooves.

However, under some conditions, the notched part or the straight guide groove must be provided across the cam groove which is formed on the stationary barrel.

For example, the notched part at which a driving gear mechanism is arranged or the straight guide groove with which a straight guide is engaged, must be provided across the cam groove on the stationary barrel when the cam groove extends circumferentially at a gradual inclination while the cam barrel is moved forward instead of the configuration in which the cam barrel is singly moved from the retracted position to the front-most position and rotated there for zooming.

Further, straight guide grooves must be provided across part of cam grooves on the stationary barrel also when multiple straight guides, for example four guide grooves away from diagonal lines of a screen, are provided to move the straight guide smoothly along the straight guide grooves in addition to the notched part which has a driving gear mechanism.

When the notched part or the straight guide groove is provided across part of a cam groove, it may sometimes happen that the cam pin goes out of the cam groove at the intersection of the cam groove and the notched part or the straight guide groove and that the cam pin or groove may be partially worn out. In extreme cases, the barrel may be disabled to move.

SUMMARY OF THE INVENTION

In consideration of the above, an object of this invention is to provide a high-reliability lens barrel which can move smooth even when the notched part which has a driving gear mechanism or the straight guide groove with which the straight guide is engaged is provided across the cam groove.

The above object can be accomplished by the following structure.

A lens barrel for zooming in the photographing region and retraction to the non-photographing region, equipped with a stationary barrel having a cam groove on the inner circumferential surface thereof, a cam barrel having a cam pin which is engaged with the cam groove of the stationary barrel on the outer circumferential surface thereof and a cam groove on the inner circumferential surface thereof and supported to rotate to the stationary barrel and to move along the optical axis, and a lens retainer having a cam pin which is engaged with the cam groove on the inner circumferential surface of the cam barrel, wherein the inner circumferential surface of the stationary barrel has a first cam groove to be used at least in a part of the photographing region and a second cam groove to be used at least in a part of the non-photographing region, and the outer circumferential surface of the cam barrel has a first cam pin to be engaged with the first cam groove and a second cam pin to be engaged with the second cam groove.

The explanation that the cam groove is engaged with the cam pin, implies the state that the cam pin is guided by the cam groove substantially without the play therebetween.

DETAILED DESCRIPTION OF THE PREFERRED EMBODIMENT

Although the present invention has been fully described in connection with the preferred embodiments thereof with reference to the accompanying drawings, this invention is not limited thereto.

Below will be explained one of preferred embodiments of this invention in reference to FIG. 1 to FIG. 4.

Figure 1:
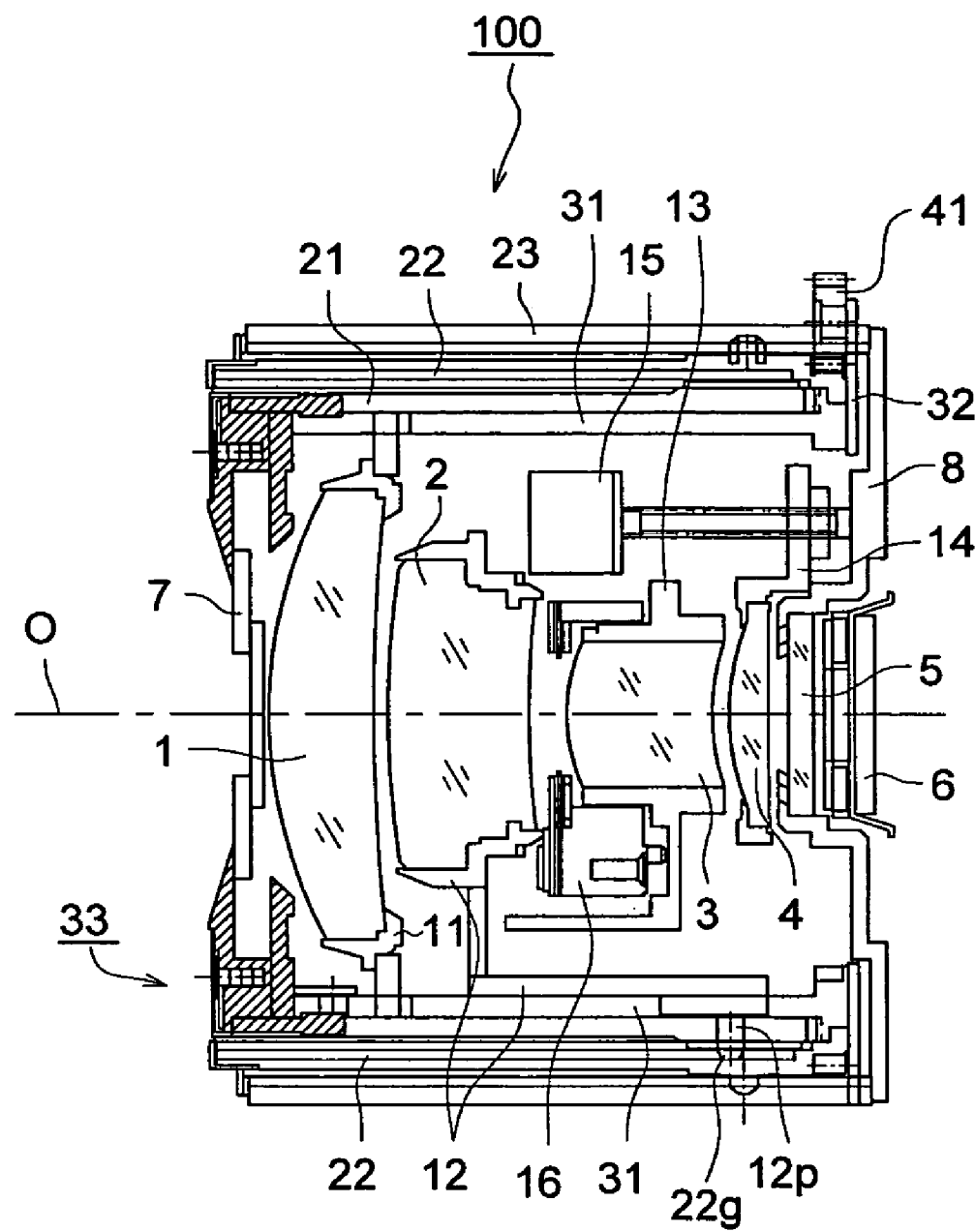
FIG. 1 is a sectional view of a lens barrel in accordance with the embodiment which is retracted to the non-photographing region.

FIG. 1 is a sectional view of lens barrel 100 in accordance with the embodiment which is retracted to the region in which photographing cannot be carried out. Lens barrel 100 of FIG. 1 indicates a state in which a zooming lens containing four groups having positive, negative, positive, and positive power in the order when viewed from the object, is retracted.

In FIG. 1, numeral 1 is a first lens group, numeral 2 is a second lens group, numeral 3 is a third lens group, numeral 4 is a fourth lens group, numeral 5 is an optical filter which is a lamination of an infrared light filter and an optical low-pass filter, and numeral 6 is an image pickup device. Numeral 8 is a bottom board which retains image pickup device 6 and other parts.

Stationary barrel 23 is fixed to bottom board 8. Cam barrel 22 is provided inside stationary barrel 23 and can rotate inside stationary barrel 23 and move along optical axis O. Front barrel 21 is provided inside cam barrel 22.

Straight guide 31 is provided inside front barrel 21. Straight guide 31 is unified with engaging plate 32 which is engaged with the straight guide groove on stationary barrel 23 so that front barrel 21 can move together with cam barrel 22 along optical axis O without revolving.

First lens group 1 is retained by first lens group moving barrel 11 which is supported by front barrel 21. In this example, front barrel 21 is engaged with straight guide 31 and a helicoid which is provided on the inner circumferential surface of cam barrel 22 so that front barrel 21 can move straight along optical axis O when cam barrel 22 rotates and moves along optical axis O.

Second lens group 2 is retained by second lens group moving barrel 2. Part of second lens group moving barrel 12 (hereinafter also referred to as a lens retainer) is engaged with straight guide 31. Cam pin 12 which is unified with or implanted in the moving barrel is engaged with the cam groove 22g formed on the inner circumferential surface of cam barrel 22 so that the moving barrel can move straight along optical axis O when cam barrel 22 rotates and moves along optical axis O.

Third lens group 3 is retained by third lens group moving barrel 13 and made to move along with front barrel 21 with a preset distance between the barrels when taking a picture. Aperture shutter unit 16 is fixed to third lens group moving barrel 13.

Fourth lens group 4 is retained by fourth lens group moving barrel 14 which is driven by stepping motor 15 to independently move along optical axis O to zoom and focus.

Cam barrel driving gear 41 is driven to rotate forward and backward by a motor and a reduction gear train (which are not shown in the drawing) so as to move cam barrel 22 forward and backward.

Lens barrier unit 33 is assembled in front barrel 21 and made up with multiple lens barriers 7. Lens barrier 7 is driven to open and close by a barrier opening and closing mechanism (which is not shown in the drawing). When front barrel 21 is retracted, this barrier opening and closing mechanism is engaged with the tip of straight guide 31 and closes lens barrier 7. When front barrel 21 is moved forward to take a picture, the barrier opening and closing mechanism is disengaged from the tip of straight guide 31 t open lens barrier 7.

Next will be explained the operation of lens barrel 100.

Figure 2A:
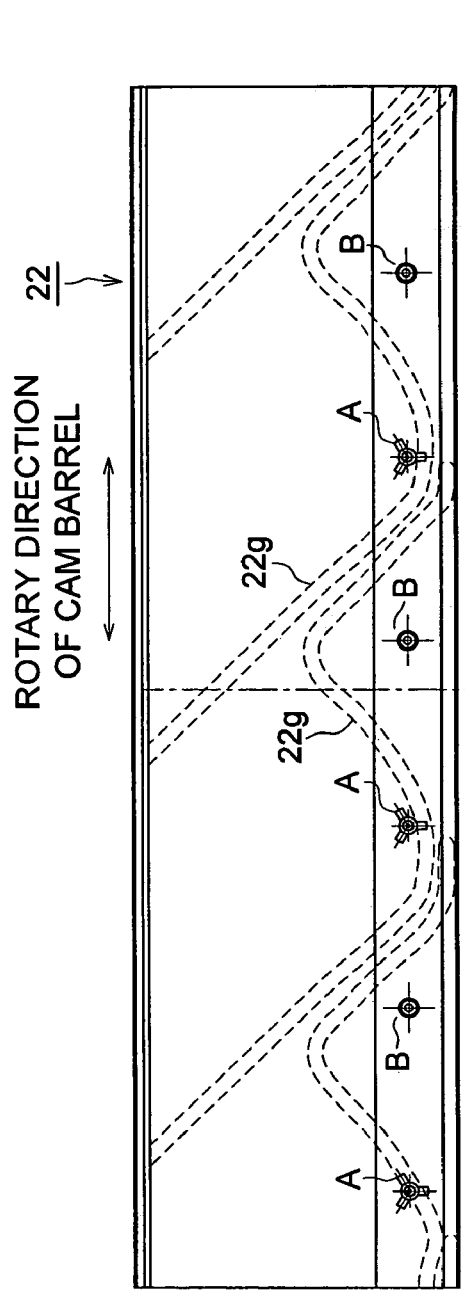
FIG. 2(a) is the development elevation of the outer circumferential surface of the cam barrel.
Figure 2B:
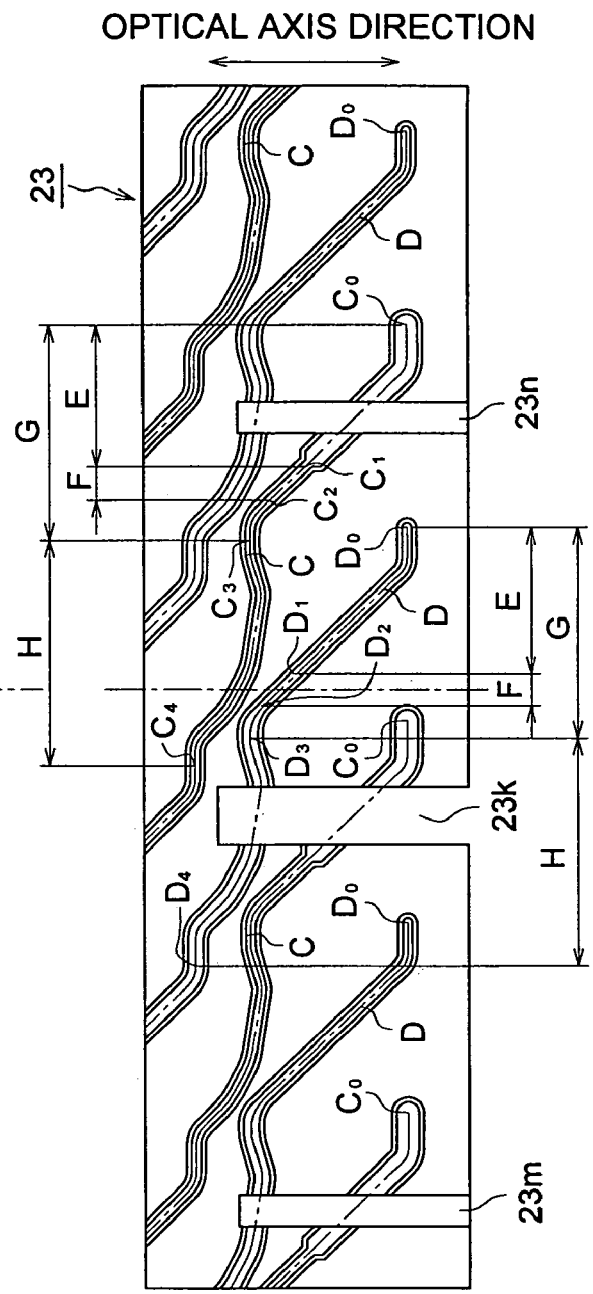
FIGS. 2(b) and 2(c) are the development elevation of cam grooves formed on the inner circumferential surface of the stationary barrel.
Figure 2:
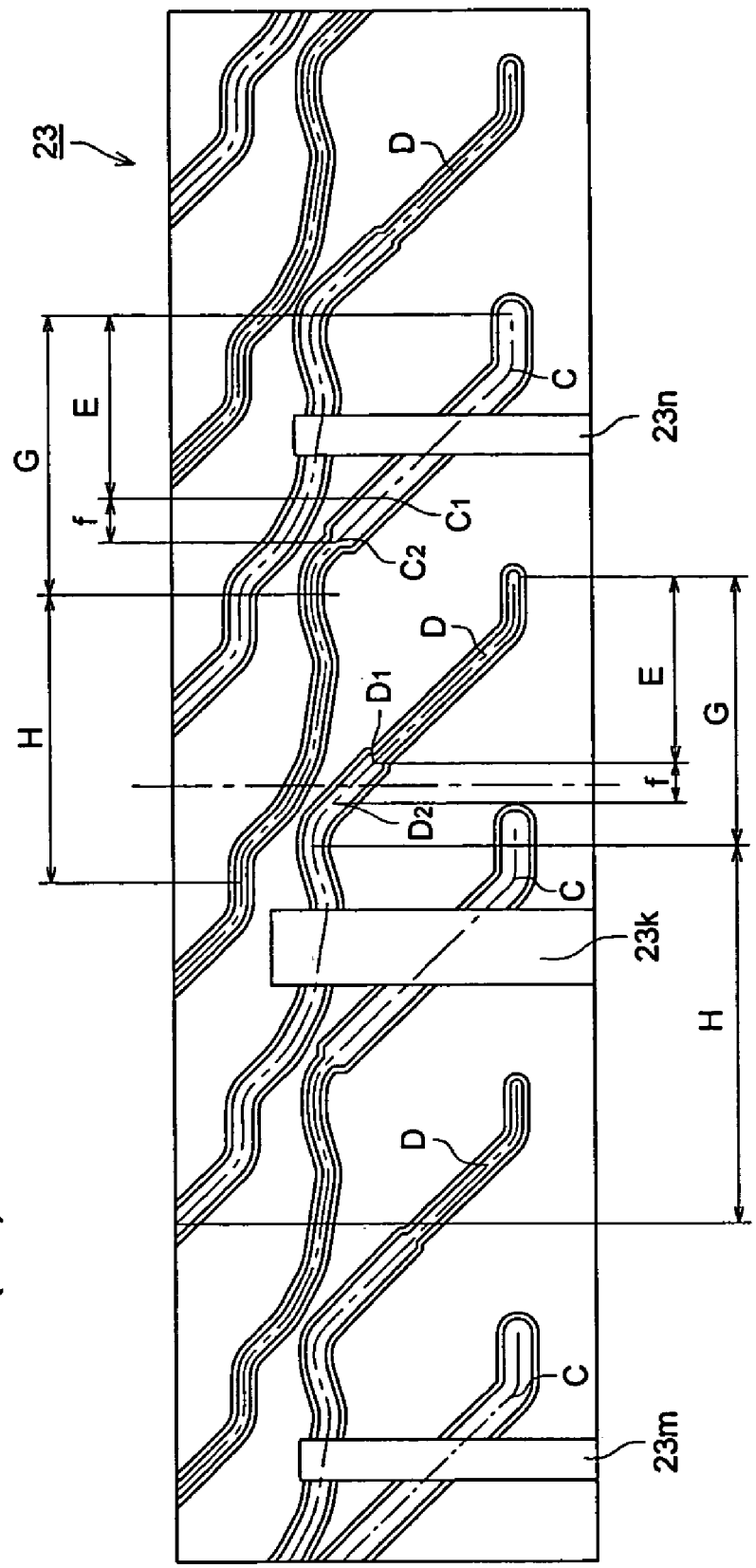

FIGS. 2(*a*) and 2(*b*) respectively show the development elevation of the outer circumferential surface of cam barrel 22 and the development elevation of cam grooves formed on the inner circumferential surface of the stationary barrel. FIG. 2(*a*) shows the development elevation of the outer circumferential surface of cam barrel 22 and FIG. 2(*b*) shows the development elevation of cam grooves formed on the inner circumferential surface of the stationary barrel.

Figure 3:
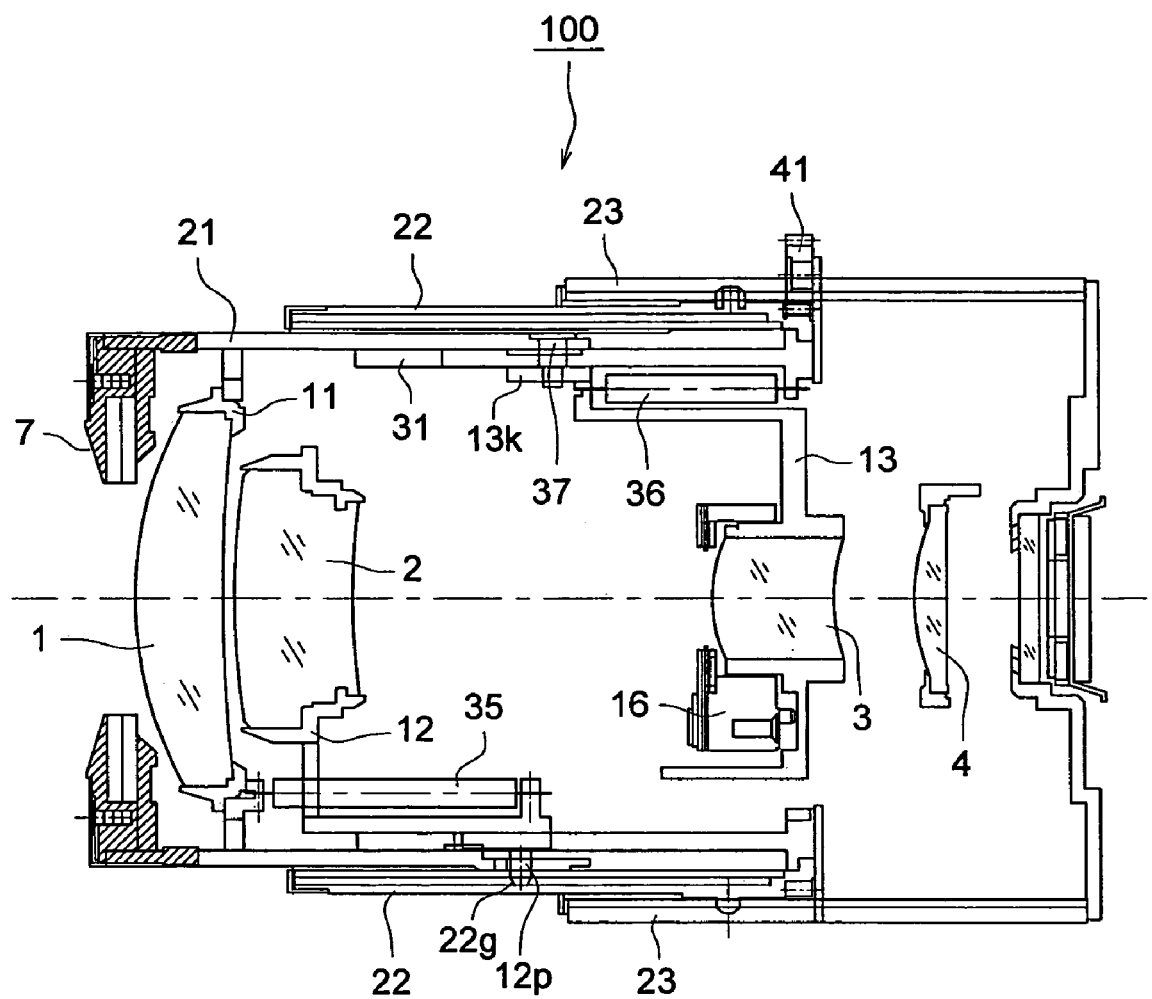
FIG. 3 is a sectional view of a lens barrel which is in the wide-angle end.

FIG. 3 is a sectional view of lens barrel 100 which is in the wide-angle end. In the following description, like parts are designated by like reference numbers throughout the several drawings.

As shown in FIG. 2(*a*), three cam pins A are formed or implanted in a body on the outer circumferential surface of cam barrel 22. Further cam pins B are formed or implanted in a body on the outer circumferential surface of cam barrel 22 with a preset distance between cam pins A and B.

As shown in FIG. 2(*b*), cam groove C for cam pin A and cam groove D for cam pin B are alternately formed on the inner circumferential surface of stationary barrel 23.

Straight guide groove 23*k*, 23*m*, and 23*n* are formed to intersect with cam grooves C and D. Straight guide grooves 23*m* and 23*n* are engaged with engaging plate 32 of FIG. 1. Wide straight guide groove 23*k* contains a notched part which is engaged with engaging plate 32 at a position which retains cam barrel driving gear 41.

Each of cam grooves C and D has two adjoining areas. A cam groove in one of the two adjoining areas is engaged with a cam pin and works as a cam groove and a cam groove in the other area is wider than a cam pin and does not work as a cam groove. Each of straight guide grooves 23*k*, 23*m*, and 23*n* is provided to intersect with the area where the cam groove which is wider than the cam pin and do not work as cam groove.

Cam pin A is engaged with cam groove C which is formed on the inner circumferential surface of stationary barrel 23 (see FIG. 2(*b*)). Cam pin B is engaged with cam groove D which is formed on the inner circumferential surface of stationary barrel 23 (see FIG. 2(*b*)). When lens barrel 100 is retracted (see FIG. 1), cam pin A is at position $C_0$ and cam pin B is at position $D_0$.

Next will be explained the movement of lens barrel 100 from the retracted position to the wide-angle end position, using a pair of cam grooves C and D of FIG. 2.

At the retracted position of FIG. 1, the motor and the reduction gear train (which are not shown in the drawing) drive cam barrel driving gear 41 to revolve cam barrel 22. With this, cam pin A moves from $C_0$ to $C_1$ and cam pin B moves from $D_0$ to $D_1$. In area E, cam pin B is engaged with cam groove D which works as a cam groove and cam pin A moves in the cam groove area which is wider than cam pin A and does not work as a cam groove. In area E, cam barrel 22 revolves and moves along the optical axis with cam pin B in cam groove D.

Further, when cam barrel 22 revolves, cam pin A moves from $C_1$ to $C_2$ and cam pin B moves from $D_1$ to $D_2$. In area F, cam pins A and B are respectively engaged with cam grooves C and D which work as cam grooves. In area F, cam barrel 22 revolves and moves along the optical axis with cam pin A in cam groove C and cam pin B in cam groove D.

Further, cam barrel 22 continues revolution. Cam pin A moves from $C_2$ to $C_3$ and cam pin B moves from $D_2$ to $D_3$. In area, cam pin A is engaged with cam groove C which works as a cam groove and cam pin B moves in the cam groove area which is wider than cam pin B and does not work as a cam groove. In this area, cam barrel 22 revolves and moves along the optical axis with cam pin A guided by cam groove C.

Cam barrel 22 stops at $C_3$ which is the wide-angle end position. In this way, lens barrel 100 has moved from the retracted position of FIG. 1 which is in the non-photographing region (i.e., the region where photographing operation cannot be achieved) to the wide-angle end of FIG. 3 which is in the photographing region.

In other words, when lens barrel 100 is moved from the retracted position to the wide-angle end in the non-photographing region G, the cam grooves areas which are intersected with the straight guide groove are made so as not to work as cam groove areas by continuously forming an area which allows cam pin B to be engaged with cam groove D and guides cam barrel 22 from the retracted position, an area which allows cam pin B to be engaged with cam groove D and cam pin A to be engaged with cam groove C and guides cam barrel 22, an area which allows cam pin A to be engaged with cam groove C and guides cam barrel 22, and changing combinations of cam pins and cam grooves.

In this way, lens barrel 100 reaches the wide-angle end of FIG. 3. The above steps are reversed when lens barrel 100 is returned from the wide-angle end to the retracted position in the non-photographing region G.

As shown in FIG. 3, when lens barrel 100 is at the wide-angle end, straight guide 31 is separated and disengaged from the barrier opening and closing mechanism (which is not shown in the drawing) and barrier 7 opens. In this status, the lens groups are spaced at preset intervals.

Front barrel 21 which is at the position of first lens group 1 moves straight from the retracted position by a distance of the sum of the distance of cam barrel 22 along the optical axis and the distance due to the rotation of helicoid which is formed on the inner circumferential surface of cam barrel 22. Second lens group moving barrel 12 which is at the position of second lens group 2 moves straight from the retracted position by a distance of the sum of the distance of cam barrel 22 along the optical axis and the distance of movement by cam pin 12$p$ guided by a cam groove 22$g$ formed on the inner circumferential surface of cam barrel 22. Front barrel 21 and second lens group moving barrel 12 are pulled to be closer together by a tension spring 35. This pulling force pulls barrels 21 and 12 towards one side of the cam groove 22$g$ and the helicoid (not shown in the drawing) to eliminate their plays.

Third lens group moving barrel 13 and aperture shutter unit 16 which are at the position of third lens group 3 keep first and third lens groups spaced at a preset interval by engagement of pin 37 formed on front barrel 21 and engaging part 13$k$ formed on third lens group moving barrel 13. Tension spring 36 is provided between third lens group moving barrel 13 and straight guide 31 to pull them together.

After cam barrel 22 stops at the wide-angle end position, fourth lens group 4 is independently moved to the predetermined wide-angle end position by stepping motor 15 (See FIG. 1).

Next will be explained the movement of lens barrel 100 between the wide-angle end position and the telephoto end position which are in the photographing region. In this region, area H (see FIG. 2 (a) and 2(b)) is used. Cam barrel 22 is guided by cam groove C on stationary barrel 22 with which cam pin A is engaged. Cam pin B moves a ca groove area which is wider than cam pin A and does not work as a cam groove.

Figure 4:
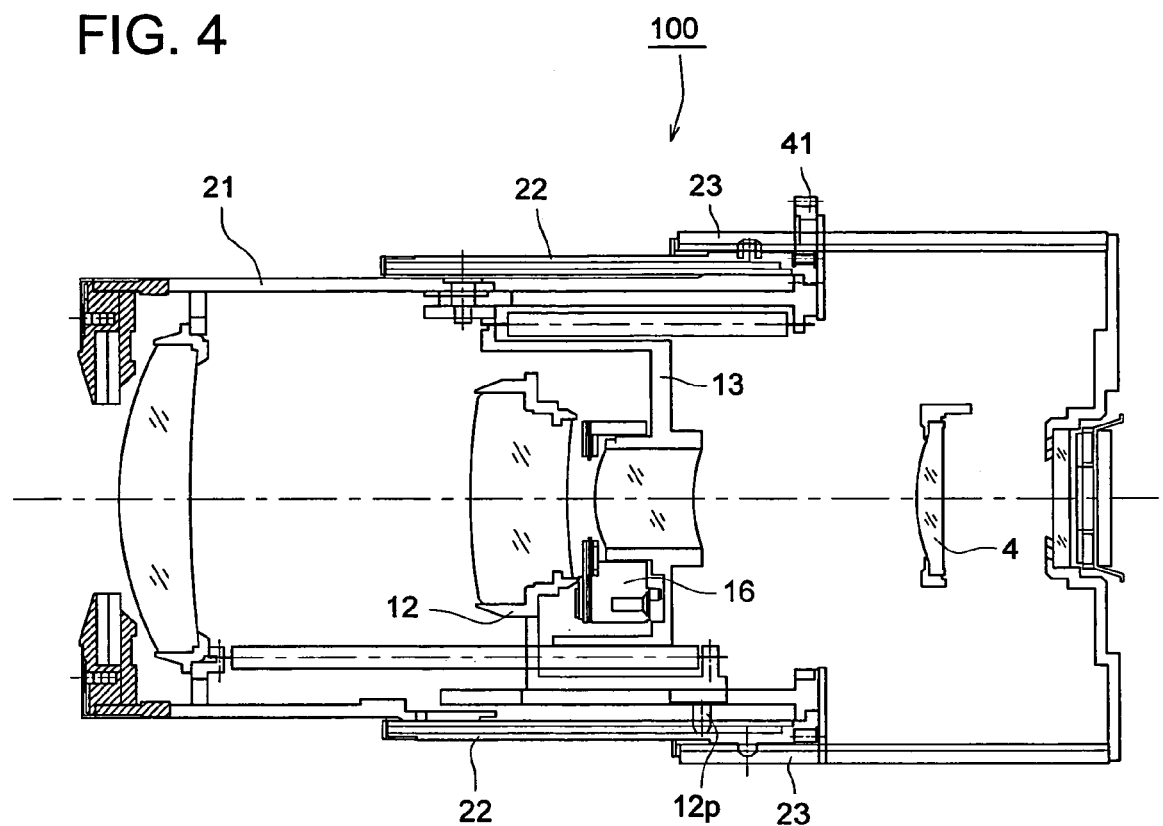
FIG. 4 is a sectional view of a lens barrel which is in the telephoto end.

FIG. 4 is a sectional view of lens barrel 100 which is in the telephoto end. Lens barrel 100 is moved to this telephoto end from the position of FIG. 3 by driving cam barrel driving gear 41 by the motor and reduction gear train (which are not shown in the drawing).

Cam barrel 22 is guided by cam groove C of stationary barrel 22 which is engaged with cam pin A to move between $C_3$ and $C_4$ in area H. (See FIGS. 2(a) and 2(b).) Front barrel 21 is further moved forward from the wide-angle end position. Second lens group moving barrel 12 moves by a distance of the sum of a distance along the optical axis from the wide-angle end position and a distance made by cam pin 12$p$ in a cam groove 22$g$ formed on the inner circumferential surface of cam barrel 22. Third lens group moving barrel 13 and aperture shutter unit 16 are further moved forward with a preset interval from first lens group 1. In this case, cam pin B moves in a cam groove area ($D_3$ to $D_4$) which is wider than cam pin A and does not work as a cam groove.

Fourth lens group 4 is independently moved to a predetermined telephoto end by stepping motor 15 (see FIG. 1).

A desired intermediate focal length can be obtained by stopping cam barrel 22 between the wide-angle end position of FIG. 3 and the telephoto end of FIG. 4.

With these, the movement of lens barrel 100 between the retracted end position ad the telephoto end position is explained.

To retract the lens barrel from the photographing region to the retracted position, first fourth lens group 4 is independently returned to its retracted position (in the image plane side) by stepping motor 15 (see FIG. 1) and then cam barrel driving gear 41 is rotated reversely (to the direction of moving the barrel forward).

As described above, it is possible to move lens barrel smoothly and steadily even in areas where cam grooves are intersected by straight grooves or other grooves by forming cam groove C for the photographing region and cam groove D for the non-photographing region on inner circumferential surface of the stationary barrel, providing cam pin A to be engaged with cam groove C and cam pin B to be engaged with cam groove D on the outer circumferential surface of the cam barrel, and by changing the combinations of cam pins and cam grooves properly.

Further, the lens barrel can move smoothly when cam grooves are changed by providing an area where cam pin A is engaged with cam groove C, an area where cam pin B is engaged with cam groove D, and an area where these two areas overlap. Further, when the overlapping area is made an non-photographing area, the lens barrel need not change cam grooves for photographing. This does not deteriorate the photographing performance of the lens barrel.

By the way, cam groove C and cam pin A in this preferred embodiment are respectively equivalent to the first cam groove and the first cam pin. Similarly, cam groove D and cam pin B in this preferred embodiment are respectively equivalent to the second cam groove and the second cam pin.

(Another Embodiment of a Cam Groove)

Further, it is also possible to provide fourth areas f shown in FIG. 2(c) where no overlapped areas are formed, which is different from the embodiment for providing the third area where the first area and the second area are overlapped as shown in FIG. 2 (b).

Namely, there are provided the first area where the cam pin A engages with the first cam groove C, the second area where the cam pin B engages with the second cam groove D, and the fourth areas f where neither first cam pin engages with the first cam groove, nor the second cam pin engages with the second cam groove, respectively. In the fourth areas f, namely, in the area covering from groove $C_1$ to groove $C_2$ and the area covering from groove $D_1$ to groove $D_2$, each cam groove does not engage with each cam pin, and is capable of guiding the cam pin while having a play between the cam groove and the cam pin.

The above preferred embodiment assumes that the first lens group is moved along the optical axis by the movement of the helicoid formed on the inner circumferential surface of the cam barrel due to revolution of the cam barrel and the second lens group retained by the lens retainer having a cam pin which is engaged with the cam groove formed on the inner circumferential surface of the cam barrel. However, this invention is not limited to these. The lens barrel can have two cam grooves on the inner circumferential surface of the cam barrel and retain the first and second lens groups by a lens retainer equipped with cam pins so that the lens groups are respectively guided by the corresponding cam grooves to move along the optical axis.

Although this embodiment uses a zoom lens barrel constituted by 4-lens groups, it is to be understood that the invention is also applicable to zoom lens barrels constituted by 2 or 3 lens groups.

This invention can provide a high-reliability lens barrel which can move smoothly even when cam grooves are disposed to be intersected with a notched part (for a driving gear) or a straight guide groove to be engaged with a straight guide.

This invention can provide a high-reliability lens barrel which can change cam grooves smoothly.

In accordance with this invention, cam grooves are changed in the non-photographing region. Therefore, cam grooves need not be changed for photographing and the photographing performance of the lens barrel is not affected.

What is claimed is:

1. A lens barrel in which a zooming in a photographing region and a retraction to a non-photographing region are carried out, the lens barrel comprising:
    (a) a stationary barrel having a cam groove on an inner circumferential surface thereof;
    (b) a cam barrel having a cam pin which is engaged with the cam groove of the stationary barrel, provided on an outer circumferential surface thereof and a cam groove provided on an inner circumferential surface thereof, and being supported rotatably to the stationary barrel and movably along an optical axis; and
    (c) a lens retainer having a cam pin which is engaged with the cam groove provided on the inner circumferential surface of the cam barrel,
    wherein a first cam groove to be used at least in a part of the photographing region and a second cam groove to be used at least in a part of the non-photographing region are formed on the inner circumferential surface of the stationary barrel, and a first cam pin to be engaged with the first cam groove and a second cam pin to be engaged with the second cam groove are formed on the outer circumferential surface of the cam barrel.

2. The lens barrel of claim 1, wherein the cam groove on the inner circumferential surface of the stationary barrel has a first region where the first cam groove is engaged with the first cam pin, a second region where the second cam groove is engaged with the second cam pin, and a third region where the first region and the second region overlap with each other.

3. The lens barrel of claim 2, wherein the third region is formed on the non-photographing region.

4. The lens barrel of claim 2, wherein when the first cam groove is engaged with the first cam pin in a position of the first region excluding the third region, the second cam groove is not engaged with the second cam pin, and when the second cam groove is engaged with the second cam pin in a position of the second region excluding the third region, the first cam groove is not engaged with the first cam pin.

5. The lens barrel of claim 1, wherein the stationary barrel comprises a straight guide groove which is engaged with a straight guide arranged rotatably on the inner circumferential surface of the cam barrel and makes the lens retainer to move along the optical axis, is provided to intersect with a region where a part of each of the first and second cam grooves which is wider than a part of each of the first and second cam pins and does not work as a cam groove.

6. The lens barrel of claim 5, wherein the straight guide groove is interposed between one region where a cam groove which works as the first cam groove is provided, and the other region where a cam grove which works as the second cam groove is provided.

7. The lens barrel of claim 1, wherein the cam groove on the inner circumferential surface of the stationary barrel has a first region where the first cam groove is engaged with the first cam pin, a second region where the second cam groove is engaged with the second cam pin, and a fourth region where the first cam groove is not engaged with the first cam pin and the second cam groove is not engaged with the second cam pin.

* * * * *